United States Patent
Lee et al.

(10) Patent No.: US 9,883,516 B2
(45) Date of Patent: Jan. 30, 2018

(54) METHOD AND APPARATUS FOR RESTRICTING FREQUENCY IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 14/760,954

(22) PCT Filed: Feb. 5, 2014

(86) PCT No.: PCT/KR2014/000992
§ 371 (c)(1),
(2) Date: Jul. 14, 2015

(87) PCT Pub. No.: WO2014/123356
PCT Pub. Date: Aug. 14, 2014

(65) Prior Publication Data
US 2015/0373729 A1  Dec. 24, 2015

Related U.S. Application Data

(60) Provisional application No. 61/761,693, filed on Feb. 6, 2013.

(51) Int. Cl.
*H04W 72/08* (2009.01)
*H04W 72/04* (2009.01)
(Continued)

(52) U.S. Cl.
CPC ......... *H04W 72/082* (2013.01); *H04W 8/245* (2013.01); *H04W 72/0453* (2013.01); *H04W 88/06* (2013.01)

(58) Field of Classification Search
CPC ........... H04W 72/0453; H04W 72/082; H04W 8/245; H04W 88/06
See application file for complete search history.

(56) References Cited

U.S. PATENT DOCUMENTS

2011/0116410 A1* 5/2011 Sung ................ H04W 52/243
370/252
2011/0312288 A1  12/2011 Fu et al.
(Continued)

FOREIGN PATENT DOCUMENTS

WO  2012/050336      4/2012
WO  2013006988 A1   1/2013

OTHER PUBLICATIONS

European Patent Office Application No. 14749495.9, Search Report dated Jun. 9, 2016, 9 pages.
(Continued)

*Primary Examiner* — Edan Orgad
*Assistant Examiner* — Nourali Mansoury
(74) *Attorney, Agent, or Firm* — Lee, Hong, Degerman, Kang & Waimey

(57) ABSTRACT

A method and apparatus for restricting a frequency in a wireless communication system is provided. A user equipment (UE) receives restriction information and a timer value from a network, starts a timer based on the timer value, and restricts usage of a frequency based on the restriction information.

14 Claims, 13 Drawing Sheets

(51) Int. Cl.
*H04W 8/24* (2009.01)
*H04W 88/06* (2009.01)

(56) References Cited

U.S. PATENT DOCUMENTS

| | | | |
|---|---|---|---|
| 2012/0040620 A1 | 2/2012 | Fu et al. | |
| 2012/0207040 A1 | 8/2012 | Comsa et al. | |
| 2012/0213162 A1 | 8/2012 | Koo et al. | |
| 2012/0214496 A1* | 8/2012 | Joko | H04W 72/082 455/448 |
| 2012/0214498 A1* | 8/2012 | Joko | H04W 72/0426 455/449 |
| 2012/0275362 A1 | 11/2012 | Park et al. | |
| 2013/0010766 A1 | 1/2013 | Sadek et al. | |
| 2013/0028201 A1 | 1/2013 | Koo et al. | |
| 2013/0051330 A1* | 2/2013 | Le | H04L 1/1854 370/329 |
| 2013/0122826 A1* | 5/2013 | Sugaya | H04L 5/003 455/73 |
| 2013/0260763 A1* | 10/2013 | Bhattad | H04W 36/0088 455/436 |
| 2014/0206341 A1* | 7/2014 | Siomina | H04W 36/0088 455/422.1 |
| 2015/0063099 A1* | 3/2015 | Sadek | H04L 1/20 370/229 |
| 2015/0245333 A1* | 8/2015 | Hulkkonen | H04W 16/14 370/329 |
| 2016/0255618 A1* | 9/2016 | Forenza | H04B 7/024 |

OTHER PUBLICATIONS

PCT International Application No. PCT/KR2014/000992, Written Opinion of the International Searching Authority dated Apr. 30, 2014, 1 page.

\* cited by examiner

METHOD AND APPARATUS FOR RESTRICTING FREQUENCY IN WIRELESS COMMUNICATION SYSTEM

CROSS-REFERENCE TO RELATED APPLICATIONS

This application is the National Stage filing under 35 U.S.C. 371 of International Application No. PCT/KR2014/000992, filed on Feb. 5, 2014, which claims the benefit of U.S. Provisional Application No. 61/761,693, filed on Feb. 6, 2013, the contents of which are all hereby incorporated by reference herein in their entirety.

BACKGROUND OF THE INVENTION

Field of the Invention

The present invention relates to wireless communications, and more particularly, to a method and apparatus for restricting a frequency in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

In order to allow users to access various networks and services ubiquitously, an increasing number of user equipments (UEs) are equipped with multiple radio transceivers. For example, a UE may be equipped with LTE, Wi-Fi, Bluetooth (BT) transceivers, etc., for wireless communication systems, and global navigation satellite system (GNSS) receivers. For example, a UE may be equipped with a LTE module and a Bluetooth module in order to receive a voice over Internet (VoIP) services and multimedia services using a Bluetooth earphone. A UE may be equipped with a LTE module and a Wi-Fi module in order to distribute traffics. A UE may be equipped with a LTE module and a GNSS module in order to acquire location information additionally.

Due to proximity of multiple radio transceivers within the same UE, the transmit power of one transmitter may be much higher than the received power level of another receiver. By means of filter technologies and sufficient frequency separation, interference between two transceivers may be avoided. But, due to extreme proximity of multiple radio transceivers within the same UE operating on adjacent frequencies or sub-harmonic frequencies, the interference power coming from a transmitter of the collocated radio may be much higher than the actual received power level of the desired signal for a receiver. This situation causes in-device coexistence (IDC) interference. The challenge lies in avoiding or minimizing IDC interference between those collocated radio transceivers, as current state-of-the-art filter technology might not provide sufficient rejection for certain scenarios. Therefore, solving the interference problem by single generic radio frequency (RF) design may not always be possible and alternative methods needs to be considered.

Interworking of 3GPP/wireless local area network (WLAN) may be introduced have been discussed. The IDC interference in interworking of 3GPP/WLAN may be considered, and accordingly, a method for avoiding the IDC interference in interworking of 3GPP/WLAN may be required.

SUMMARY OF THE INVENTION

The present invention provides a method and apparatus for restricting a frequency in a wireless communication system. The present invention provides a method for indicating a restricted frequency with a cause value. The present invention provides a method for avoiding in-device coexistence (IDC) interference in interworking of 3rd generation partnership project (3GPP)/wireless local area network (WLAN).

In an aspect, a method for restricting, by a user equipment (UE), a frequency in a wireless communication system is provided. The method includes receiving restriction information and a timer value from a network, starting a timer based on the timer value, and restricting usage of a frequency based on the restriction information.

The restriction information may include information an unusable frequency in an unlicensed band.

The unlicensed band may be included in one of an 3rd generation partnership project (3GPP) long-term evolution (LTE) band, Wi-Fi band, Bluetooth band, global positioning system (GPS) band.

The restriction information may include at least one of direction of in-device coexistence (IDC) interference and a cause value which indicates that the frequency in the unlicensed band is affected by the IDC interference.

The restriction information may be based on IDC indications from other UEs.

The timer value may be fixed.

The usage of the frequency may be restricted while the timer is running

In another aspect, a user equipment (UE) in a wireless communication system is provided. The UE includes a radio frequency (RF) unit for transmitting or receiving a radio signal, and a processor couple to the RF unit, and configured to receive restriction information and a timer value from a network, start a timer based on the timer value, and restrict usage of a frequency based on the restriction information.

Occurrence of interference during transmission of traffic may be prevented in advance. Accordingly, quality of service (QoS) of a user may increase.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
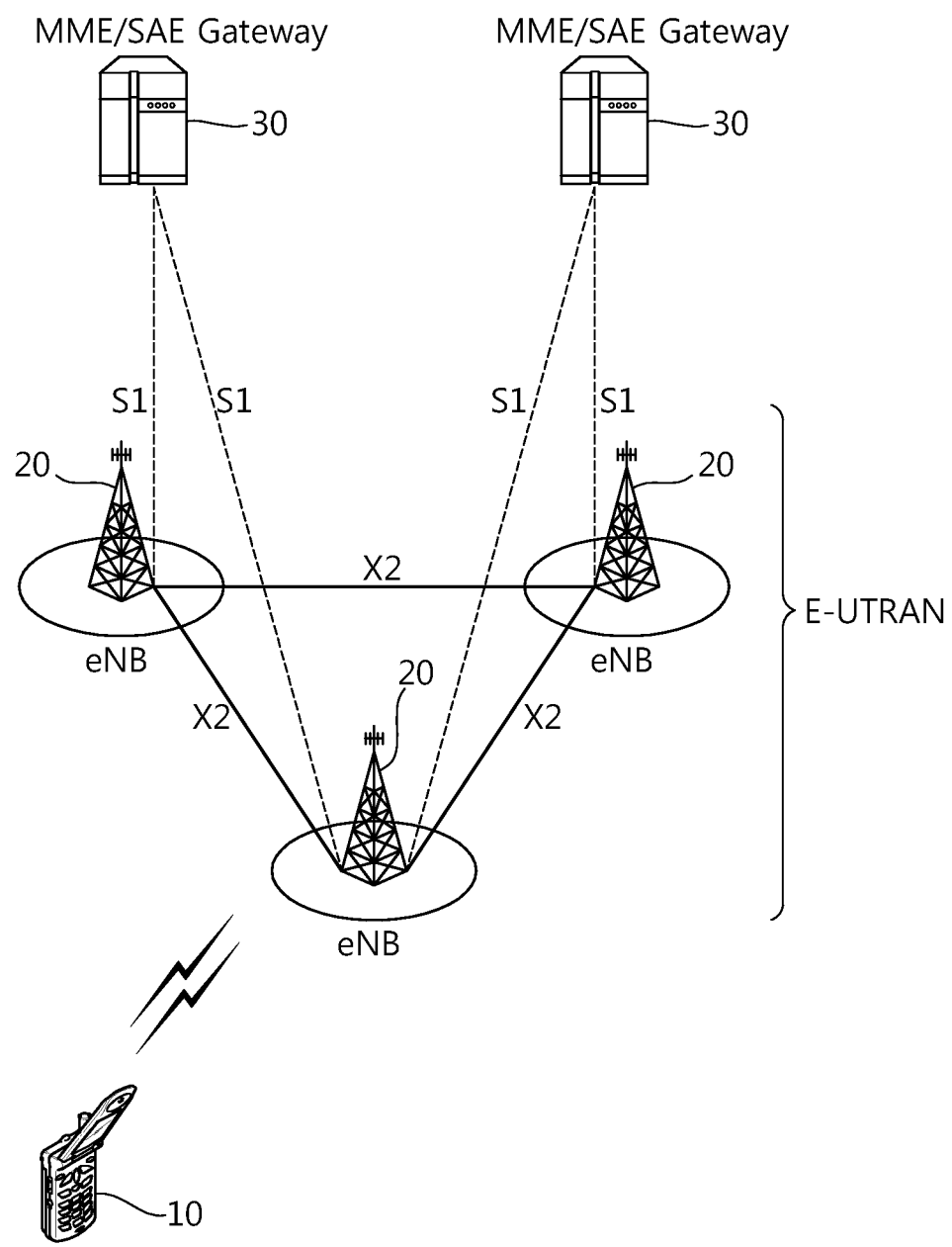
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
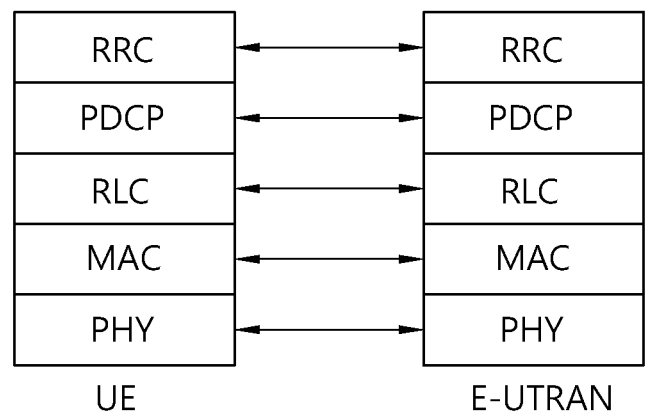
FIG. 2 shows a control plane of a radio interface protocol of an LTE system.
Figure 3:
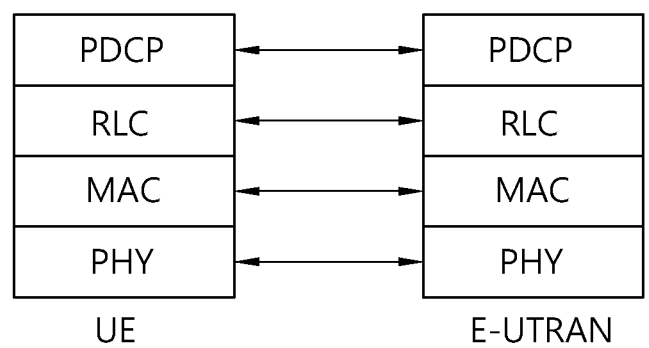
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
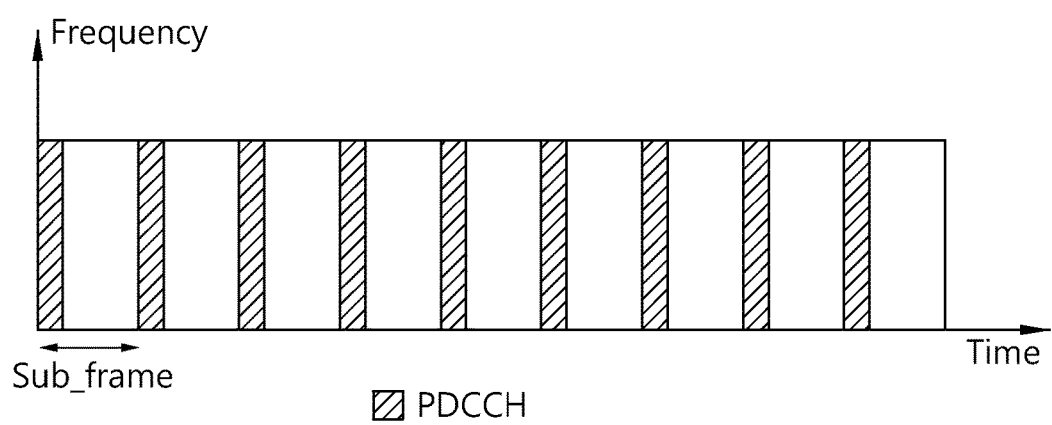
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or Ipv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

The UE which remains in RRC_IDLE persistently performs cell reselection to find a better cell. In this case, the UE performs measurement and cell reselection by using frequency priority information. That is, the UE may determine which frequency will be preferentially considered when performing frequency measurement and cell reselection on the basis of the frequency priority information. The UE may receive the frequency priority information by using system information or an RRC connection release message. Or, the UE may receive the frequency priority information from another radio access technology (RAT) in inter-RAT cell reselection.

It is known that different cause values may be mapped to the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

In-device coexistence (IDC) is described below. It may be referred to Section 23.4 of 3GPP TS 36.300 V11.4.0 (2012-12).

Figure 5:
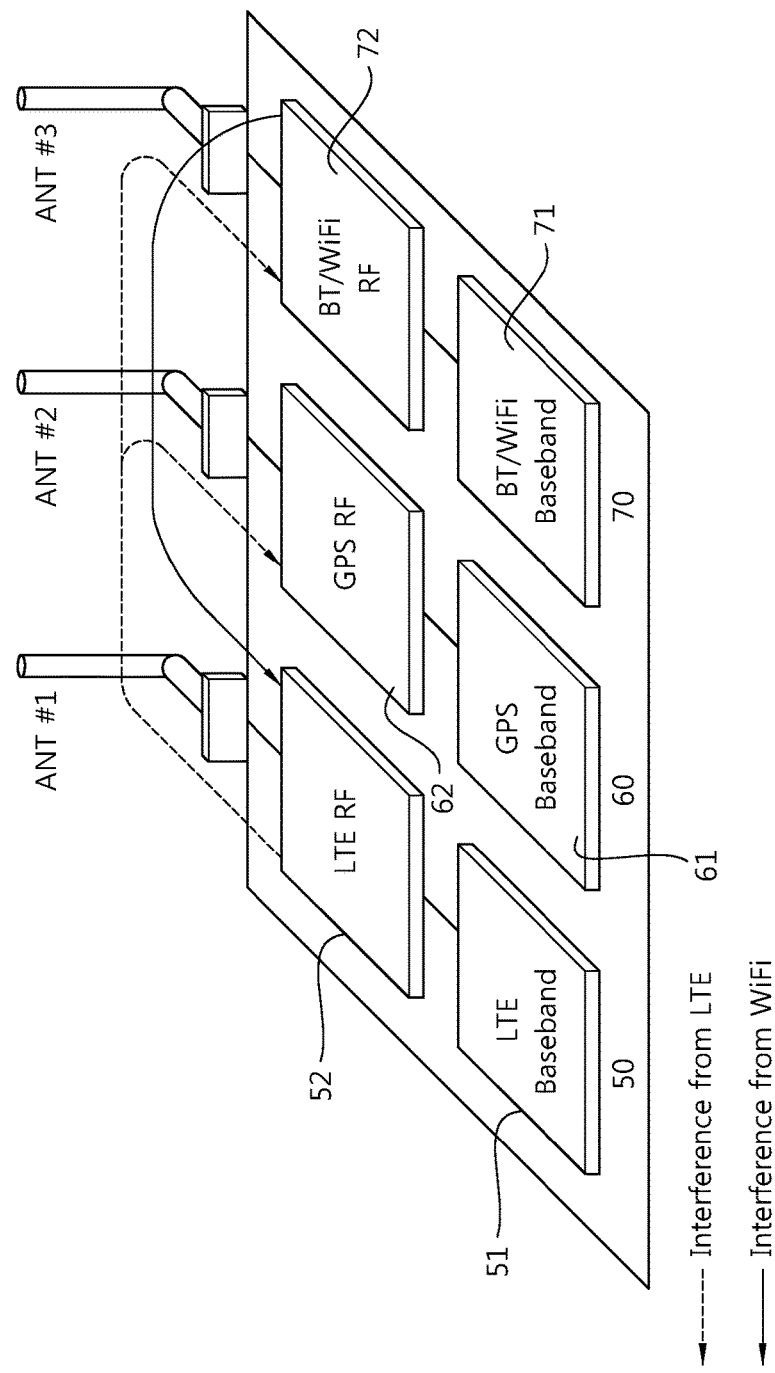
FIG. 5 shows an example of IDC interference within a UE.

FIG. 5 shows an example of IDC interference within a UE.

A LTE module 50 includes a LTE baseband 51 and a LTE radio frequency (RF) 52. A global positioning system (GPS) module 60 includes a GPS baseband 61 and a GPS RF 62. A Bluetooth (BT)/Wi-Fi module 70 includes a BT/Wi-Fi baseband 71 and a BT/Wi-Fi RF 72. For example, if all of the LTE module 50, the GPS module 60 and the BT/Wi-Fi module 70 are switched on, the LTE module 50 may interfere the GPS module 60 and the BT/Wi-Fi module 70. Or the BT/Wi-Fi module 70 may interfere the LTE module 50.

Coexistence interference scenarios between LTE radio and other radio technologies are described. 3GPP frequency bands around 2.4 GHz industrial, scientific and medical (ISM) bands are considered.

Figure 6:
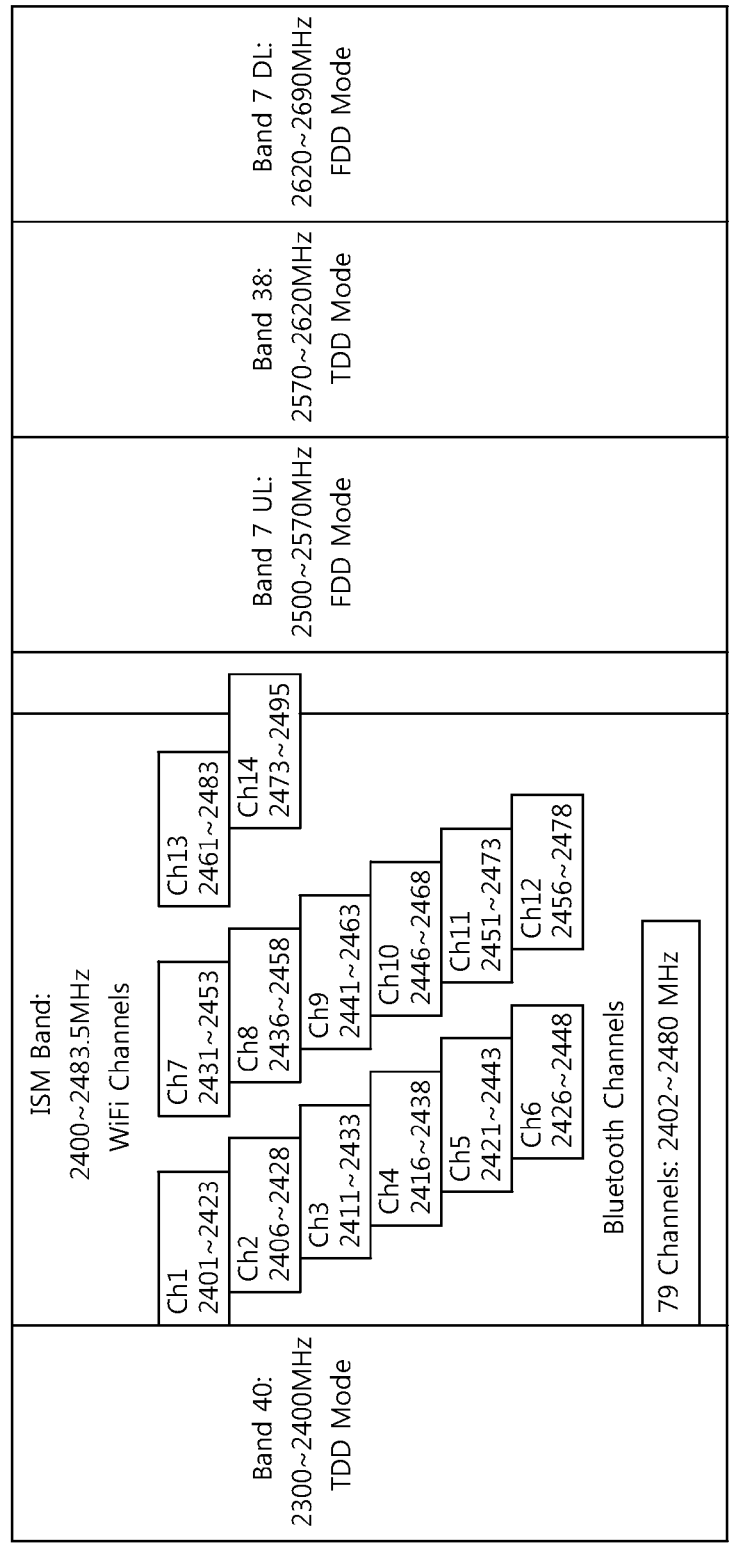
FIG. 6 shows 3GPP frequency bands around ISM band.

FIG. 6 shows 3GPP frequency bands around ISM band.

There are 14 channels demarcated in ISM band for Wi-Fi operation. Each channel has 5 MHz separation from other channel with an exception of channel number 14 where separation is 12 MHz. Channel 1 starts with 2401 MHz and channel 14 ends at 2495 MHz. Different countries have different policies for number of allowed channels of Wi-Fi. The transmitter of LTE band 40 may affect receiver of Wi-Fi and vice-versa. Since band 7 is a FDD band, so there is no impact on the LTE receiver from the Wi-Fi transmitter. But the Wi-Fi receiver will be affected by the LTE uplink transmitter.

Bluetooth operates in 79 channels of 1 MHz each in ISM band. The first channel starts with 2402 MHz and the last channel ends at 2480 MHz. Similar as Wi-Fi case, the activities of LTE band 40 and Bluetooth may disturb each other, and the transmission of LTE band 7 UL may affect Bluetooth reception as well.

Three modes are considered in order to avoid the IDC interference according to whether there is coordination between a LTE module and other coexisting radio technology modules or not and whether there is coordination between the LTE module and an eNB or not. At first, in an uncoordinated mode, different radio technology modules within the UE operate independently without any internal coordination between each other. The LTE module and the network do not have any coordination between each other, either. In this case, the LTE module cannot handle appropriately deterioration of service quality due to the IDC interference as the LTE module does not know information on other coexisting radio technology modules. Secondly, in a UE-coordinated mode, there is an internal coordination between the different radio technology modules within the UE, which means that at least the activities of one radio technology module is known by other radio technology module. Each radio technology module can know on/off status and/or traffic transmission status of other radio technology modules within the UE. However, the network is not aware of the coexistence issue possibly experienced by the UE and is therefore not involved in the coordination. Third, in a network-coordinated mode, there is an internal coordination between the different radio technology modules within the UE, and there is coordination between the UE and the network. Each radio technology module can know on/off status and/or traffic transmission status of other radio technology modules within the UE, and the UE can inform the network of the IDC interference. Accordingly, the network makes determination for avoiding the IDC interference.

The LTE module may measure the IDC interference by cooperating with other radio modules within the UE or by inter/intra frequency measurements.

When a UE experiences a level of IDC interference that cannot be solved by the UE itself and a network intervention is required, the UE sends an IDC indication via dedicated RRC signaling to report the problems. The details of the IDC indication trigger are left up to UE implementation. It may rely on existing LTE measurements and/or UE internal coordination. The IDC indication should be triggered based on ongoing IDC interference on the serving or non-serving frequencies, instead of assumptions or predictions of potential interference. A UE that supports IDC functionality indicates this capability to the network, and the network can then configure by dedicated signaling whether the UE is allowed to send an IDC indication. The UE may only send an IDC indication for E-UTRA UL/DL carriers for which a measurement object is configured.

The term "ongoing IDC interference" should be treated as a general guideline by the UE. For the serving frequency, ongoing interference consists of interference caused by aggressor radio to victim radio during either active data exchange or upcoming data activity which is expected in up to a few hundred milliseconds. For the non-serving frequency, ongoing interference is anticipation that the LTE radio will either become aggressor or victim if it is handed over to the non-serving frequency. Similarly for secondary cells (Scells) in case of carrier aggregation (CA), ongoing interference is anticipation that the LTE radio will either become aggressor or victim if activation of the Scells takes place. Ongoing interference is applicable over several subframes/slots where not necessarily all the subframes/slots are affected.

When notified of IDC problems through an IDC indication from the UE, the eNB can choose to apply a frequency division multiplexing (FDM) solution or a time division multiplexing (TDM) solution:

The basic concept of an FDM solution is to move the LTE signal away from the ISM band by performing inter-frequency handover within E-UTRAN. The FDM solution may be implemented by conventional handover procedures.

The basic concept of a TDM solution is to ensure that transmission of a radio signal does not coincide with reception of another radio signal. LTE DRX mechanism is considered as a baseline to provide TDM patterns (i.e., periods during which the LTE UE may be scheduled or is not scheduled) to resolve the IDC issues. DRX based TDM solution should be used in a predictable way, i.e., the eNB should ensure a predictable pattern of unscheduled periods by means of DRX mechanism.

Figure 7:
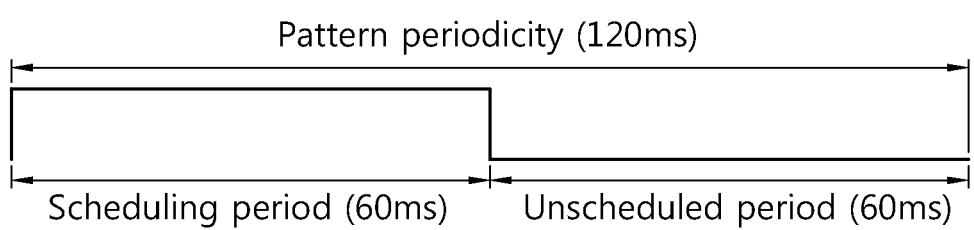
FIG. 7 shows an example of a TDM pattern according to a TDM solution.

FIG. 7 shows an example of a TDM pattern according to a TDM solution.

Referring to FIG. 7, a periodicity of a TDM pattern is 120 ms. A LTE module performs transmission or reception using only a scheduling period having a length of 60 ms. Another coexisting radio technology module performs transmission or reception using only an unscheduled period having a length of 60 ms.

To assist the eNB in selecting an appropriate solution, all necessary/available assistance information for both FDM and TDM solutions is sent together in the IDC indication to the eNB. The IDC assistance information contains the list of E-UTRA carriers suffering from ongoing interference and, depending on the scenario, it also contains TDM patterns or parameters to enable appropriate DRX configuration for TDM solutions on the serving E-UTRA carrier. The IDC indication is also used to update the IDC assistance information, including for the cases when the UE no longer suffers from IDC interference. A prohibit mechanism is used to restrict the interval at which the UE sends the IDC indication. In case of inter-eNB handover, the IDC assistance information is transferred from the source eNB to the target eNB.

The UE should only indicate "IDC over" when it does no longer experience an IDC issue it cannot solve by itself. The UE should not resend the same IDC indication message to the network, but the UE may resend the same IDC indication after handover.

Figure 8:
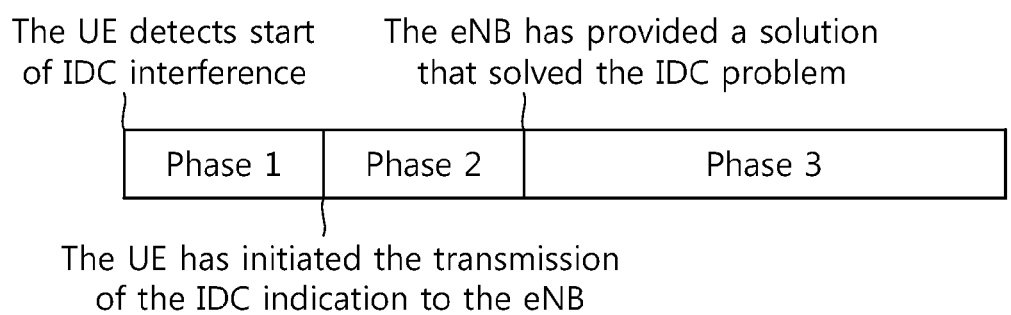
FIG. 8 shows different phases of IDC interference related to operation by a UE.

FIG. 8 shows different phases of IDC interference related to operation by a UE.

IDC interference situation may be divided into following three phases according to FIG. 8. In phase 1, the UE detects start of IDC interference but does not initiate the transmission of the IDC indication to the eNB yet. In phase 2, the UE has initiated the transmission of the IDC indication to the eNB and no solution is yet configured by the eNB to solve the IDC issue. In phase 3, the eNB has provided a solution that solved the IDC interference to the UE.

In different phases, UE behaviors related to radio resource management (RRM), radio link management (RLM), and channel state information (CSI) measurements are shown in Table 1.

TABLE 1

| Phases of IDC Interference | RRM Measurements | RLM Measurements | CSI Measurements |
| --- | --- | --- | --- |
| Phase 1 | Up to UE implementation and RRM measurement requirements apply | Up to UE implementation and RLM measurement requirements apply | Up to UE implementation and CSI measurement requirements apply |
| Phase 2 | UE shall ensure the measurements are free of IDC interference and RRM measurement requirements apply | UE shall ensure the measurements are free of IDC interference and RLM measurement requirements apply | |
| Phase 3 | UE shall ensure the measurements are free of IDC interference and RRM measurement requirements apply | UE shall ensure the measurements are free of IDC interference and RLM measurement requirements apply | |

In addition, once configured by the network, the UE can autonomously deny LTE UL transmission in all phases to protect ISM in rare cases if other solutions cannot be used. Conversely, it is assumed that the UE also autonomously denies ISM transmission in order to ensure connectivity with the eNB to perform necessary LTE procedures, e.g., RRC connection reconfiguration and paging reception, etc. The network may configure a long-term denial rate by dedicated RRC signaling to limit the amount of LTE UL autonomous denials. Otherwise, the UE shall not perform any LTE UL autonomous denials.

IDC indication is described. It may be referred to Section 5.6.9 of 3GPP TS 36.331 V11.2.0 (2012-12). The purpose of this procedure is to inform the E-UTRAN about (a change of) the IDC problems experienced by the UE in RRC_CONNECTED, and to provide the E-UTRAN with information in order to resolve them.

Figure 9:
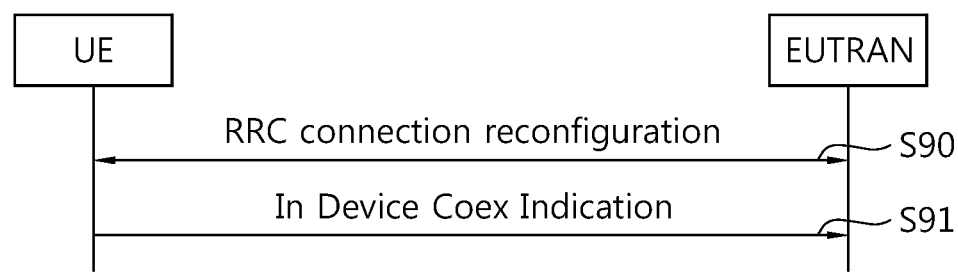
FIG. 9 shows an IDC indication procedure.

FIG. 9 shows an IDC indication procedure. At step S90, the UE and the E-UTRAN performs an RRC connection reconfiguration procedure. At step S91, the UE transmits an InDeviceCoexIndication message to the E-UTRAN on a DCCH.

A UE capable of providing IDC indications may initiate the procedure when it is configured to provide IDC indications, upon change of IDC problem information and upon handover completion. Upon initiating the procedure, the UE shall:
1> if configured to provide IDC indications:
2> if the UE did not transmit an IDC indication since it was configured to provide IDC indications:
3> if on one or more frequencies for which a measObject-EUTRA is configured, the UE is experiencing ongoing IDC problems that it cannot solve by itself:
4> initiate the transmission of the InDeviceCoexIndication message;
2> else:
3> if the set of frequencies, for which a measObjectEUTRA is configured and on which the UE is experiencing ongoing IDC problems that it cannot solve by itself, is different from the set indicated in the last transmitted InDeviceCoexIndication message; or
3> if for one or more of the frequencies in the previously reported set of frequencies, the interferenceDirection is different from the value indicated in the last transmitted InDeviceCoexIndication message; or
3> if the TDM assistance information is different from the assistance information included in the last transmitted InDeviceCoexIndication message; or
3> if upon handover completion, the UE had transmitted an InDeviceCoexIndication message during the last 1 second preceding reception of the RRCConnectionReconfiguration including mobilityControlInfo:
4> initiate transmission of the InDeviceCoexIndication message The UE shall set the contents of the InDeviceCoexIndication message as follows:
1> if there is at least one E-UTRA carrier frequency, for which a measurement object is configured, that is affected by IDC problems:
2> include the IE affectedCarrierFreqList with an entry for each affected E-UTRA carrier frequency for which a measurement object is configured;
2> for each E-UTRA carrier frequency included in the IE affectedCarrierFreqList, include interferenceDirection and set it accordingly;
2> include Time Domain Multiplexing (TDM) based assistance information:
3> if the UE has DRX related assistance information that could be used to resolve the IDC problems:
4> include drx-CycleLength, drx-Offset and drx-ActiveTime;
3> else (the UE has desired subframe reservation patterns related assistance information that could be used to resolve the IDC problems):
4> include idc-SubframePatternList;

When sending an InDeviceCoexIndication message to inform the E-UTRAN the IDC problems, the UE includes all assistance information (rather than providing, e.g., the changed part(s) of the assistance information). When sending an InDeviceCoexIndication message to inform the E-UTRAN the IDC problem is over, the UE includes neither the IE affectedCarrierFreqList nor the IE tdm-AssistanceInfo.

The UE shall submit the InDeviceCoexIndication message to lower layers for transmission.

Wi-Fi protocols are described. Wi-Fi is a popular technology that allows an electronic device to exchange data wirelessly (using radio waves) over a computer network, including high-speed Internet connections. The Wi-Fi Alliance defines Wi-Fi as any "wireless local area network (WLAN) products that are based on the IEEE 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or hotspot) has a range of about 20 meters (65 feet) indoors and a greater range outdoors. Hotspot coverage can comprise an area as small as a single room with walls that block radio waves or as large as many square miles—this is achieved by using multiple overlapping access points.

"Wi-Fi" is a trademark of the Wi-Fi Alliance and the brand name for products using the IEEE 802.11 family of standards. Only Wi-Fi products that complete Wi-Fi Alliance interoperability certification testing successfully may use the "Wi-Fi CERTIFIED" designation and trademark.

Wi-Fi has had a checkered security history. Its earliest encryption system, wired equivalent privacy (WEP), proved easy to break. Much higher quality protocols, Wi-Fi protected access (WPA) and WPA2, were added later. However, an optional feature added in 2007, called Wi-Fi protected setup (WPS), has a flaw that allows a remote attacker to recover the router's WPA or WPA2 password in a few hours on most implementations. Some manufacturers have recommended turning off the WPS feature. The Wi-Fi Alliance has since updated its test plan and certification program to ensure all newly certified devices resist brute-force AP PIN attacks.

The 802.11 family consist of a series of half-duplex over-the-air modulation techniques that use the same basic protocol. The most popular are those defined by the 802.11b and 802.11g protocols, which are amendments to the original standard. 802.11-1997 was the first wireless networking standard, but 802.11b was the first widely accepted one, followed by 802.11g and 802.11n. 802.11n is a new multi-streaming modulation technique. Other standards in the family (c-f, h, j) are service amendments and extensions or corrections to the previous specifications.

802.11b and 802.11g use the 2.4 GHz ISM band, operating in the United States under Part 15 of the US Federal Communications Commission Rules and Regulations. Because of this choice of frequency band, 802.11b and g equipment may occasionally suffer interference from microwave ovens, cordless telephones and Bluetooth devices. 802.11b and 802.11g control their interference and susceptibility to interference by using direct-sequence spread spectrum (DSSS) and OFDM signaling methods, respectively. 802.11a uses the 5 GHz U-NII band, which, for much of the world, offers at least 23 non-overlapping channels rather than the 2.4 GHz ISM frequency band, where adjacent channels overlap. Better or worse performance with higher or lower frequencies (channels) may be realized, depending on the environment.

The segment of the radio frequency spectrum used by 802.11 varies between countries. In the US, 802.11a and 802.11g devices may be operated without a license, as allowed in Part 15 of the FCC Rules and Regulations. Frequencies used by channels one through six of 802.11b and 802.11g fall within the 2.4 GHz amateur radio band. Licensed amateur radio operators may operate 802.11b/g devices under Part 97 of the FCC Rules and Regulations, allowing increased power output but not commercial content or encryption.

Figure 10:
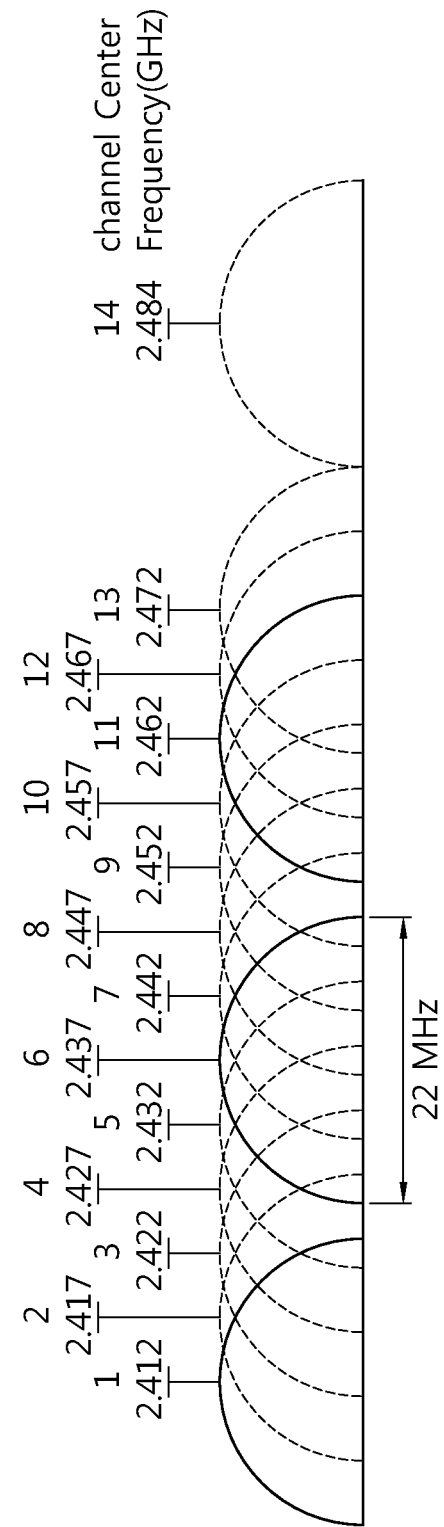
FIG. 10 shows a graphical representation of Wi-Fi channels in 2.4 GHz band.

FIG. 10 shows a graphical representation of Wi-Fi channels in 2.4 GHz band.

802.11 divides each of the above-described bands into channels, analogous to the way radio and TV broadcast bands are sub-divided. For example the 2.4000-2.4835 GHz band is divided into 13 channels spaced 5 MHz apart, with channel 1 centered on 2.412 GHz and 13 on 2.472 GHz (to which Japan added a $14^{th}$ channel 12 MHz above channel 13 which was only allowed for 802.11b). 802.11b was based on DSSS with a total channel width of 22 MHz and did not have steep skirts. Consequently only three channels do not overlap. Even now, many devices are shipped with channels 1, 6 and 11 as preset options even though with the newer 802.11g standard there are four non-overlapping channels— 1, 5, 9 and 13. There are now four because the OFDM modulated 802.11g channels are 20 MHz wide.

Availability of channels is regulated by country, constrained in part by how each country allocates radio spectrum to various services. At one extreme, Japan permits the use of all 14 channels for 802.11b, while other countries such as Spain initially allowed only channels 10 and 11, and France only allowed 10, 11, 12 and 13. They now allow channels 1 through 13. North America and some Central and South American countries allow only 1 through 11.

In addition to specifying the channel centre frequency, 802.11 also specifies a spectral mask defining the permitted power distribution across each channel. The mask requires the signal be attenuated a minimum of 20 dB from its peak amplitude at ±11 MHz from the centre frequency, the point at which a channel is effectively 22 MHz wide. One consequence is that stations can only use every fourth or fifth channel without overlap, typically 1, 6 and 11 in the Americas, and in theory, 1, 5, 9 and 13 in Europe although 1, 6, and 11 is typical there too. Another is that channels 1-13 effectively require the band 2.401-2.483 GHz, the actual allocations being, for example, 2.400-2.4835 GHz in the UK, 2.402-2.4735 GHz in the US, etc.

Most Wi-Fi devices default to regdomain 0, which means least common denominator settings, i.e., the device will not transmit at a power above the allowable power in any nation, nor will it use frequencies that are not permitted in any nation.

The regdomain setting is often made difficult or impossible to change so that the end users do not conflict with local regulatory agencies such as the Federal Communications Commission.

Current 802.11 standards define "frame" types for use in transmission of data as well as management and control of wireless links.

Frames are divided into very specific and standardized sections. Each frame consists of a MAC header, payload and frame check sequence (FCS). Some frames may not have the payload. The first two bytes of the MAC header form a frame control field specifying the form and function of the frame. The frame control field is further subdivided into the following sub-fields:

Protocol Version: two bits representing the protocol version. Currently used protocol version is zero. Other values are reserved for future use.

Type: two bits identifying the type of WLAN frame. Control, data and management are various frame types defined in IEEE 802.11.

Sub Type: Four bits providing addition discrimination between frames. Type and Sub type together to identify the exact frame.

ToDS and FromDS: Each is one bit in size. They indicate whether a data frame is headed for a distribution system. Control and management frames set these values to zero. All the data frames will have one of these bits set. However communication within an independent basic service set (IBSS) network always set these bits to zero.

More Fragments: The More Fragments bit is set when a packet is divided into multiple frames for transmission. Every frame except the last frame of a packet will have this bit set.

Retry: Sometimes frames require retransmission, and for this there is a Retry bit which is set to one when a frame is resent. This aids in the elimination of duplicate frames.

Power Management: This bit indicates the power management state of the sender after the completion of a frame exchange. Access points are required to manage the connection and will never set the power saver bit.

More Data: The More Data bit is used to buffer frames received in a distributed system. The access point uses this bit to facilitate stations in power saver mode. It indicates that at least one frame is available and addresses all stations connected.

WEP: The WEP bit is modified after processing a frame. It is toggled to one after a frame has been decrypted or if no encryption is set it will have already been one.

Order: This bit is only set when the "strict ordering" delivery method is employed. Frames and fragments are not always sent in order as it causes a transmission performance penalty.

The next two bytes are reserved for the Duration ID field. This field can take one of three forms: Duration, Contention-Free Period (CFP), and Association ID (AID).

An 802.11 frame can have up to four address fields. Each field can carry a MAC address. Address 1 is the receiver, Address 2 is the transmitter, Address 3 is used for filtering purposes by the receiver.

The Sequence Control field is a two-byte section used for identifying message order as well as eliminating duplicate frames. The first 4 bits are used for the fragmentation number and the last 12 bits are the sequence number.

An optional two-byte Quality of Service control field which was added with 802.11e.

The Frame Body field is variable in size, from 0 to 2304 bytes plus any overhead from security encapsulation and contains information from higher layers.

The frame check sequence (FCS) is the last four bytes in the standard 802.11 frame. Often referred to as the cyclic redundancy check (CRC), it allows for integrity check of retrieved frames. As frames are about to be sent the FCS is calculated and appended. When a station receives a frame it can calculate the FCS of the frame and compare it to the one received. If they match, it is assumed that the frame was not distorted during transmission.

Management frames allow for the maintenance of communication. Some common 802.11 subtypes include:

Authentication frame: 802.11 authentication begins with the wireless network interface controller (WNIC) sending an authentication frame to the access point containing its identity. With an open system authentication the WNIC only sends a single authentication frame and the access point responds with an authentication frame of its own indicating acceptance or rejection. With shared key authentication, after the WNIC sends its initial authentication request it will receive an authentication frame from the access point containing challenge text. The WNIC sends an authentication frame containing the encrypted version of the challenge text to the access point. The access point ensures the text was encrypted with the correct key by decrypting it with its own key. The result of this process determines the WNIC's authentication status.

Association request frame: sent from a station it enables the access point to allocate resources and synchronize. The frame carries information about the WNIC including supported data rates and the SSID of the network the station wishes to associate with. If the request is accepted, the access point reserves memory and establishes an association ID for the WNIC.

Association response frame: sent from an access point to a station containing the acceptance or rejection to an association request. If it is an acceptance, the frame will contain information such an association ID and supported data rates.

Beacon frame: Sent periodically from an access point to announce its presence and provide the SSID, and other parameters for WNICs within range.

Deauthentication frame: sent from a station wishing to terminate connection from another station.

Disassociation frame: sent from a station wishing to terminate connection. It's an elegant way to allow the access point to relinquish memory allocation and remove the WNIC from the association table.

Probe request frame: sent from a station when it requires information from another station.

Probe response frame: sent from an access point containing capability information, supported data rates, etc., after receiving a probe request frame.

Reassociation request frame: A WNIC sends a reassociation request when it drops from range of the currently associated access point and finds another access point with a stronger signal. The new access point coordinates the forwarding of any information that may still be contained in the buffer of the previous access point.

Reassociation response frame: sent from an access point containing the acceptance or rejection to a WNIC reassociation request frame. The frame includes information required for association such as the association ID and supported data rates.

Control frames facilitate in the exchange of data frames between stations. Some common 802.11 control frames include:

Acknowledgement (ACK) frame: After receiving a data frame, the receiving station will send an ACK frame to the sending station if no errors are found. If the sending station doesn't receive an ACK frame within a predetermined period of time, the sending station will resend the frame.

Request to send (RTS) frame: The RTS and CTS frames provide an optional collision reduction scheme for access points with hidden stations. A station sends a RTS frame to as the first step in a two-way handshake required before sending data frames.

Clear to send (CTS) frame: A station responds to an RTS frame with a CTS frame. It provides clearance for the requesting station to send a data frame. The CTS provides collision control management by including a time value for which all other stations are to hold off transmission while the requesting stations transmits.

Data frames carry packets from web pages, files, etc., within the body, using RFC 1042 encapsulation and EtherType numbers for protocol identification.

The BSS is the basic building block of an 802.11 wireless LAN. In infrastructure mode, a single AP together with all associated stations (STAs) is called a BSS. This is not to be confused with the coverage of an access point, which is called basic service area (BSA). The access point acts as a master to control the stations within that BSS. The simplest BSS consists of one access point and one station. In ad hoc mode, a set of synchronized stations (one of which acts as master) forms a BSS.

With 802.11, it is possible to create an ad-hoc network of client devices without a controlling access point; the result is called an IBSS.

Each BSS is uniquely identified by what's called a basic service set identification (BSSID). For a BSS operating in infrastructure mode, the BSSID is the MAC address of the wireless access point (WAP). For an IBSS, the BSSID is a locally administered MAC address generated from a 46-bit random number. The individual/group bit of the address is set to 0 (individual). The universal/local bit of the address is set to 1 (local).

A BSSID with a value of all is used to indicate the broadcast BSSID, which may only be used during probe requests.

An extended service set (ESS) is a set of one or more interconnected BSSs and integrated local area networks that appear as a single BSS to the logical link control layer at any station associated with one of those BSSs. The BSSs may work on the same channel, or work on different channels to boost aggregate throughput.

Each ESS is identified by a service set identifier (SSID). For an IBSS, the SSID is chosen by the client device that starts the network, and broadcasting of the SSID is performed in a pseudo-random order by all devices that are members of the network. The maximum length of the SSID is currently 32 bytes long.

3GPP/WLAN interworking is described. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a UE (e.g., WLAN, WiMAX location information, etc), inter-system mobility policies (ISMP) which is able to reflect operator's policies, and inter-system routing policy (ISRP). Based on the information described above, the UE may determine which IP traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

The MAPCON is a standardization of a technology which enables configuring and maintaining multiple PDN connectivity simultaneously through 3GPP access and non-3GPP access, and enables a seamless traffic offloading in units of all active PDN connections. For this, an ANDSF server provides access point name (APN) information for performing offloading, routing rule, time of day information, and validity area information, etc.

The IFOM supports mobility in a unit of IP flow, which is more flexible and more segmented than the MAPCON, and seamless offloading. The IFOM enables access to different access networks even when the UE is connected to a PDN using the same APN, which is different from the MAPCON. The IFOM also enables mobility in a unit of specific IP traffic flow, not a unit of PDN, for a unit of mobility or offloading, and accordingly, services may be provided flexibly. For this, an ANDSF server provides IP flow information for performing offloading, routing rule, time of day information, and validity area information, etc.

The non-seamless WLAN offloading is a technology that offloads traffics completely so as not to go through the EPC as well as that changes a path of a specific IP traffic to WLAN. The offloaded IP traffic cannot be moved to 3GPP access seamlessly again since anchoring is not performed to the P-GW for mobility support. For this, an ANDSF server provides information as similar as the information provided for the IFOM.

A UE, which is transmitting traffic in an LTE cell or which has traffic to be transmitted in the LTE cell, may transmit all or a part of the traffic through WLAN by a policy received from a network (e.g., ANDSF policy or policy received from an eNB) or a command received from the eNB. For example, when a UE in a macro cell approaches a Wi-Fi cell, the UE can move subset of PDN connections or individual IP flows to the Wi-Fi cell autonomously according to the policy received from the network. Under this situation, the transmission of moved PDN connections or IP flows through WLAN may interfere the reception in the LTE cell within the same device. Or, the reception of moved PDN connections, IP flows or services through WLAN may be interfered by the transmission in the LTE cell. In other words, the UE may experience the IDC interference. Due to this IDC interference, the UE may experience the degradation of quality.

Accordingly, in order to avoid the IDC interference problem described above, a method for indicating a problematic frequency to the UE may be proposed according to an embodiment of the present invention. According to the embodiment of the present invention, in interworking of 3GPP access network and non-3GPP access network (e.g., WLAN), a method for indicating a frequency in which the IDC interference may occur may be proposed for avoiding the IDC interference in advance when a policy or assistance information for the interworking is transmitted to the UE. Accordingly, the UE can avoid the frequency in which the IDC interference may occur. For example, for avoiding the IDC interference due to offloading of traffic from the LTE cell to the Wi-Fi cell, a frequency in which the IDC interference may occur may be indicated to the UE when a policy (or, assistance information) for offloading or a command is transmitted to the UE.

Figure 11:
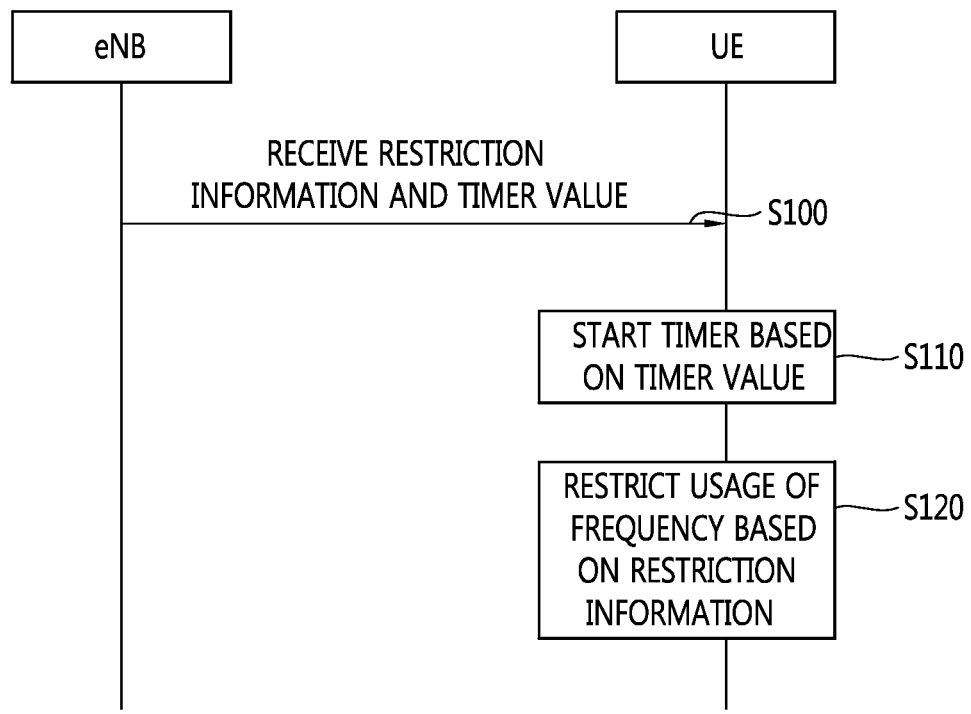
FIG. 11 shows an example of a method for restricting a frequency according to an embodiment of the present invention.

FIG. 11 shows an example of a method for restricting a frequency according to an embodiment of the present invention.

In step S100, the UE receives restriction information and a timer value from a network. The restriction information may include at least one of information on an unusable frequency in an unlicensed band, IDC interference direction, a cause value which indicates that the unusable frequency in the unlicensed band is affected by the IDC interference, and validity time of the restriction information. The unlicensed band may be included one of an LTE band, Wi-Fi band, Bluetooth band, GPS band, etc.

For example, the restriction information may include restricted Wi-Fi channel information. In this case, the restricted Wi-Fi channel information may include at least one of a center frequency, an unusable Wi-Fi channel number, IDC interference direction, a cause value that indicates that Wi-Fi channel is affected by the IDC interference, and validity time of the restricted Wi-Fi channel information.

The network may accumulate unusable frequency information by the IDC indications from other UEs. For this, the UE may indicate the unusable frequency in the unlicensed band and the IDC interference direction when there is on-going IDC interference from the LTE to the unlicensed band and/or from the unlicensed band to the LTE.

The IDC interference may occur when different radio technology modules coexist in the same UE. For example, the IDC interference may occur when the LTE module and the Wi-Fi module coexist in the same UE. LTE TDD may operate in band 40 (2300 MHz~2400 MHz), and Wi-Fi may operate in unlicensed band (2400 MHz~2483.5 MHz). In this case, transmission of LTE module may interfere reception of Wi-Fi module, or the reception of the LTE module may be interfered by transmission of Wi-Fi module or Bluetooth module. Or, LTE FDD may operate in band 7 (2500 MHz~2700 MHz), and Wi-Fi and Bluetooth may operate in unlicensed band (2400 MHz~2483.5 MHz). In this case, uplink transmission of LTE module may interfere reception of Wi-Fi module or Bluetooth module.

In step S110, the UE stores the received restriction information, and starts a timer based on the timer value included in the received restriction information. Alternatively, the timer value may be fixed. The UE considers the received restriction information valid during the timer is running.

In step S120, the UE restricts usage of a frequency based on the restriction information while the timer is running.

For example, when the UE moves all or a part of PDN connections/IP flows/Docket services/applications from the LTE to the Wi-Fi, the UE may avoid those Wi-Fi channels (or, frequency) contained in the restricted Wi-Fi channel information during Wi-Fi channel (or, frequency) discovery (or, try to connect with the WLAN). The UE may not try to connect with the WLAN even if the corresponding Wi-Fi channels (or, frequency) are detected. Or, the UE may consider those Wi-Fi channels (or, frequency) as lowest priority during Wi-Fi channel (or, frequency) discovery. The UE may discover highest priority Wi-Fi channels (or, frequency) first. The UE may consider those Wi-Fi channels (or, frequency) even if the corresponding Wi-Fi channels (or, frequency) are detected. The UE may try to connect with highest priority Wi-Fi channels (or, frequency) first.

Optionally, the UE may perform operations described above when the UE receives a command to move a part of traffic from the 3GPP access network to the WLAN by an offloading policy or command. If the UE receives a command to move all of traffic from the 3GPP access network to the WLAN by an offloading policy or command, the UE may ignore the restricted Wi-Fi channel information and may discover the Wi-Fi channels (or, frequency) contained in the restricted Wi-Fi channel information. If the corresponding Wi-Fi channels (or, frequency) are detected, the corresponding Wi-Fi channels (or, frequency) may be considered as targets of offloading.

If the network determines that some frequencies are not unusable any more, the network may update the restriction information. For example, if the network determines that some Wi-Fi channels are not unusable any more, the network explicitly releases parts of the restricted Wi-Fi channel information transmitted previously.

In order to update the restriction information, the network may transmit usable frequencies to the UE. Upon receiving the usable frequencies, the UE may delete the usable frequencies from the unusable frequencies in the restriction information. For, example, the network may transmit usable Wi-Fi channel number, and upon receiving the above message, the UE may delete the usable Wi-Fi channel number from the restricted Wi-Fi channel information. Alternatively, the network may transmit updated restriction information. Upon receiving the updated restriction information, the UE may replace the old restriction information with the updated restriction information.

The usability of a frequency may be determined when there is no IDC interference between the LTE and the unlicensed band. Or, the usability of a frequency may be determined when the IDC interference between the LTE and the unlicensed band is less than a threshold.

Figure 12:
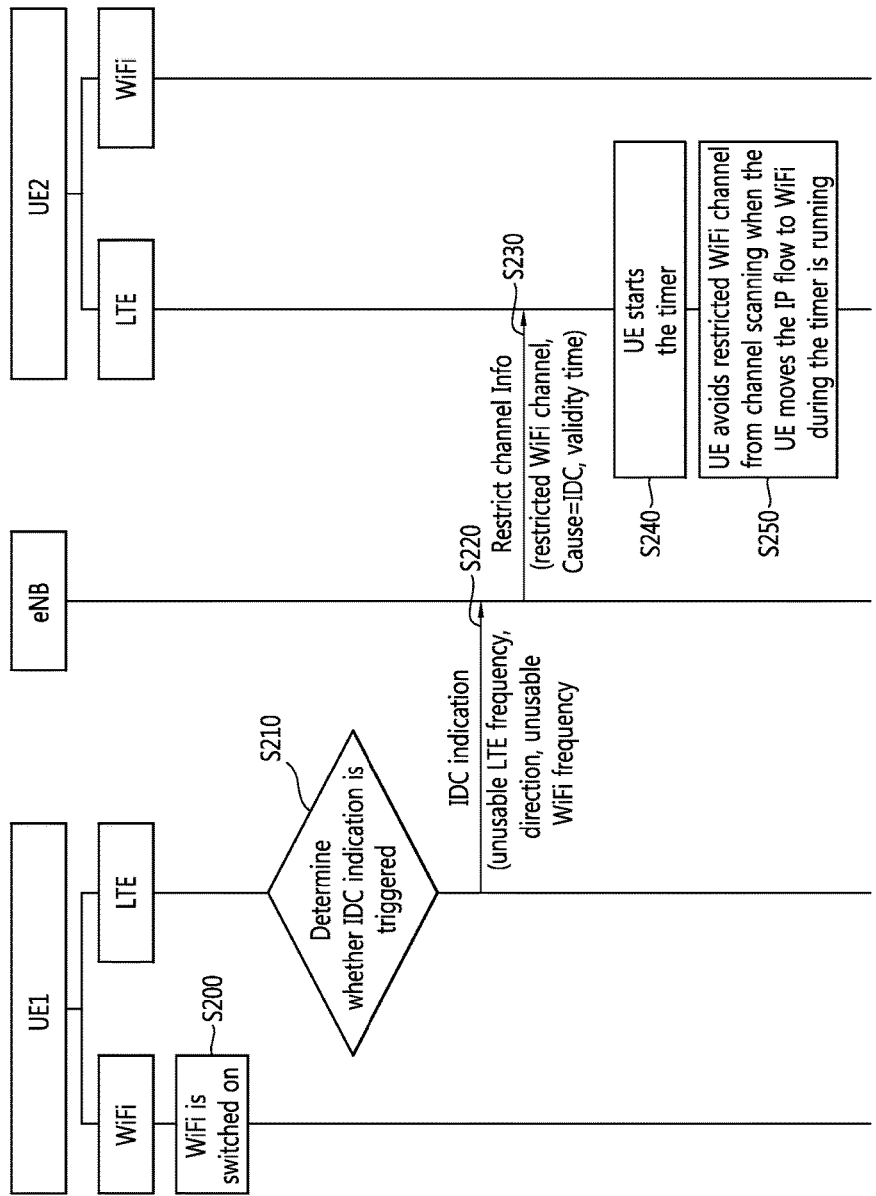
FIG. 12 shows an example of a method for restricting a frequency according to another embodiment of the present invention.

FIG. 12 shows an example of a method for restricting a frequency according to another embodiment of the present invention.

In step S200, the Wi-Fi module in the UE1 is turned on to transmit and receive the data.

In step S210, the LTE module in the UE1 determines that there is on-going IDC interference.

In step S220, the LTE module in the UE1 transmits the IDC indication, which includes at least one of unusable LTE frequency, IDC interference direction, and unusable Wi-Fi frequency (channel) information.

In step S230, the network notifies restricted channel information, which includes the acquired unusable Wi-Fi channel information, to the UE2 equipped with a Wi-Fi module. The restricted channel information may further include a cause value which indicates that the Wi-Fi channel is affected by the IDC interference, and validity time of the restricted channel information. The restricted channel information may be transmitted when assistance information for interworking of 3GPP and WLAN is transmitted.

In step S240, upon receiving the restricted channel information, the UE starts a timer based on the restricted channel information.

In step S250, the LTE module in the UE2 avoids restricted Wi-Fi channel from channel scanning procedure when the UE moves the IP flow to the Wi-Fi while the timer is running Interworking decision depending on the IDC interference phase may be considered. Depending on the severity level of the IDC interference, the UE which experiences the IDC interference may be in phase 1, 2 and 3. When the UE moves all or a part of PDN connections/IP flows/services/applications, the UE may consider its own IDC interference phase to determine whether to move or not since the LTE band can coexist with the unlicensed band within the UE without the IDC interference in phase 3. More specifically, in phase 1 and 2, the UE may restrict the unusable frequency in the unlicensed band, but in phase 3, the UE may not restrict the unusable frequency in the unlicensed band.

Figure 13:
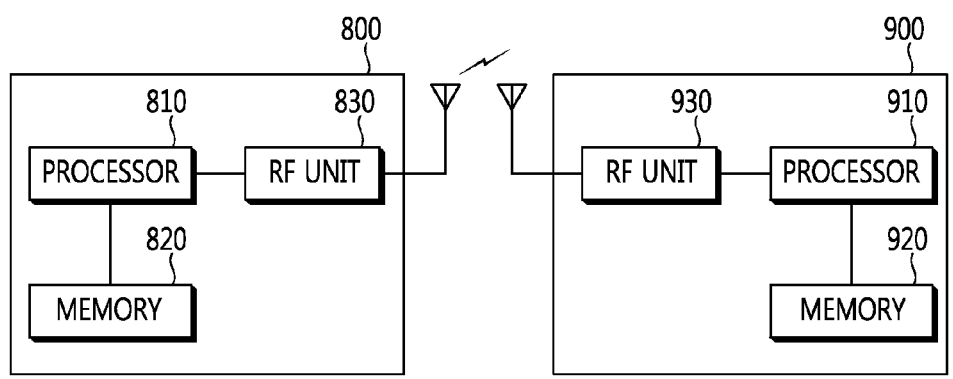
FIG. 13 shows a wireless communication system to implement an embodiment of the present invention.

FIG. 13 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the embodiments of the present invention, the UE may perform per cell (frequency) based or per UE based LTE autonomous denial in multiple cells (frequencies) which can be all the serving cells including Pcell and Scells or cells indicated by the network.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for restricting a frequency in a wireless communication system, the method performed by a first user equipment (UE) and comprising:
   receiving restriction information from a 3rd generation partnership project (3GPP) access network, the information including an unusable frequency for a wireless network local area network (WLAN) and a timer value;
   starting a timer based on the timer value; and
   offloading traffic from the 3GPP access network to the WLAN based on the restriction information and the timer,
   wherein use of the unusable frequency is restricted while the offloading is performed and the timer is running.

2. The method of claim 1, wherein the restriction information further includes information related to the unusable frequency in an unlicensed band.

3. The method of claim 2, wherein the unlicensed band is included in a 3GPP long-term evolution (LTE) band, a Wi-Fi band, a Bluetooth band, or a global positioning system (GPS) band.

4. The method of claim 2, wherein the restriction information further includes at least a direction of in-device coexistence (IDC) interference or a cause value indicating that the unusable frequency in the unlicensed band is affected by the IDC interference.

5. The method of claim 1, wherein the restriction information is based on in-device coexistence (IDC) indications from UEs other than the first UE.

6. The method of claim 1, wherein the timer value is predetermined.

7. The method of claim 1, wherein the UE transmits traffic using the WLAN instead of the 3GPP access network while the offloading is performed.

8. A first user equipment (UE) for restricting a frequency in a wireless communication system, the UE comprising:
   a radio frequency (RF) unit configured to transmit or receive a radio signal; and
   a processor coupled to the RF unit, and configured to:
   control the RF unit to receive restriction information from a 3rd generation partnership project (3GPP) access network, the information including an unusable frequency for a wireless network local area network (WLAN) and a timer value;
   start a timer based on the timer value; and
   offload traffic from the 3GPP access network to the WLAN based on the restriction information and the timer,
   wherein use of the unusable frequency is restricted while the offloading is performed and the timer is running.

9. The UE of claim 8, wherein the restriction information further includes information related to the unusable frequency in an unlicensed band.

10. The UE of claim 9, wherein the unlicensed band is included in a 3GPP long-term evolution (LTE) band, a Wi-Fi band, a Bluetooth band, or a global positioning system (GPS) band.

11. The UE of claim 9, wherein the restriction information further includes at least a direction of in-device coexistence (IDC) interference or a cause value indicating that the unusable frequency in the unlicensed band is affected by the IDC interference.

12. The UE of claim 8, wherein the restriction information is based on in-device coexistence (IDC) indications from UEs other than the first UE.

13. The UE of claim 8, wherein the timer value is predetermined.

14. The UE of claim 8, wherein the UE transmits traffic using the WLAN instead of the 3GPP access network while the offloading is performed.

* * * * *